United States Patent Office 3,512,560
Patented May 19, 1970

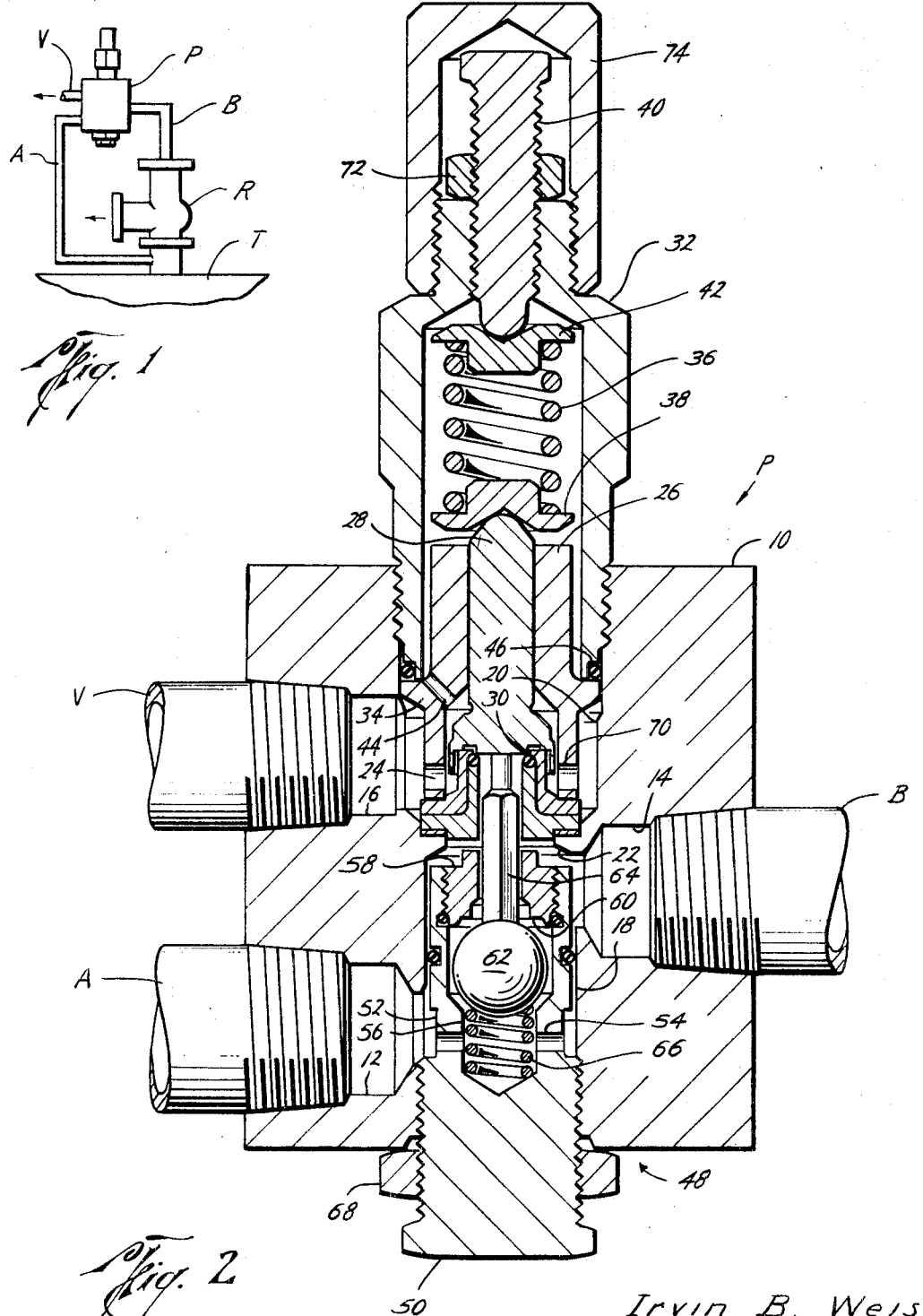

3,512,560
RELIEF VALVE
Irvin B. Weise, Bellaire, Tex., assignor to Anderson, Greenwood & Co., Houston, Tex., a corporation of Texas
Continuation-in-part of application Ser. No. 482,465, Aug. 25, 1965. This application Feb. 19, 1968, Ser. No. 711,821
Int. Cl. F16k 17/10
U.S. Cl. 137—102                                    9 Claims

ABSTRACT OF THE DISCLOSURE

A pilot valve for controlling a pressure relief valve in which two inter-connected, resiliently loaded pressure responsive valve members control the flow between three ports and including external means for adjusting the amount of blowdown past one of said valve members by varying the positions of one of the valve seats with respect to the other.

CROSS-REFERENCES TO RELATED APPLICATION

This application is a continuation-in-part application based on my earlier filed copending application Ser. No. 482,465, filed Aug. 25, 1965 now abandoned.

SUMMARY

The present invention generally relates to an improved pilot valve and specifically to an improved three-way pilot valve for controlling the operation of a main pressure relief valve.

An object of the present invention is to provide an improved three-way pilot valve having an adjustable blowdown control.

Another object of the present invention is to provide an improved three-way pilot valve to control a pressure relief valve in which the improved pilot valve has adjustable means controlling the opening pressure of the relief valve and adjustable means controlling the closing pressure of the relief valve.

A still further object is to provide a three-way pilot valve which vents responsive to control pressure and closes against inlet pressure having means to adjust the setting of the venting pressure and means to adjust the setting of the closing pressure having no substantial effect on the means adjusting the venting pressure.

Another object of the present invention is to provide an improved three-way pilot valve for a pressure relief valve in which flow through the pilot valve is closed during relieving of the pressure relief valve and including means for varying the amount of blowdown of the pressure relief valve.

Another object of the present invention is to provide an improved pilot valve having two seats, two valve members with a connection therebetween and means adjusting the travel of the valve members to adjust the closing pressure of a pressure relief valve controlled by the pilot valve.

Still another object is to provide an improved relief valve which when set to relieve gas at a preselected pressure, will relieve a liquid at substantially the same pressure.

A further object is to provide an improved pilot valve having restrictions to the flow of fluid therethrough which function to provide a snap action of the valve members in both directions.

BRIEF DESCRIPTION OF THE DRAWINGS

These and other objects of the present invention are more clearly set forth and explained hereinafter in relation to the drawings wherein:

FIG. 1 is a schematic illustration of the three-way pilot valve of the present invention installed on a pressure relief valve.

FIG. 2 is a detail cross-sectional view of a three-way pilot valve of the present invention.

DESCRIPTION OF THE PREFERRED EMBODIMENTS

Referring more in detail to the drawings, the pressure relief valve R is shown connected to a tank T which contains a fluid under pressure, which pressure is to be controlled by the pressure relief valve. The three-way pilot valve P of the present invention is connected to the pressure relief valve R as shown. The line A connects from the inlet of the pressure relief valve R to the inlet of the three-way pilot valve P. Line B connects from the actuating chamber of the pressure relief valve R to the control pressure connection in the three-way pilot valve P. The line V is the vent for the three-way pilot valve P and may connect to atmosphere, to the vent line of the pressure relief valve R or to any other suitable venting means.

The function of the three-way pilot valve P is to control the pressure in the actuating chamber of the relief valve R to maintain the relief valve R closed when the pressure conditions within the tank T or other pressure system on which the relief valve R has been installed are less than the predetermined relieving pressure. Thereafter, the pilot valve P should function to exhaust pressure fluid from the actuator of relief valve R and vent such fluid through the line V until the system pressure in the tank T is reduced to a safe level or predetermined closing pressure for the relief valve R at which time the pilot valve P directs pressure to the actuating chamber of the relief valve R to cause the relief valve R to close. The blowdown of the relief valve R, the amount of pressure reduction in the tank T, is therefore controlled by the pilot valve P.

In FIG. 2 the three-way pilot valve P of the present invention is illustrated in detail including connections of the lines A, B and V therein. The pilot valve P includes the valve body 10 into which the lines A, B and V are threadedly engaged. The line A connects into the inlet 12; the line B connects into the control pressure port 14; and the line V connects to the exhaust 16. The main portion of the valve body 10 is provided with a lower bore 18 and an upper bore 20 in communication with the bore 18. The lower bore 18 provides communication between the inlet 12 and the control pressure port 14. The control pressure port 14 is also in communication with the exhaust 16 through the annular shoulder 22 which surrounds the inner extremity of the bores 18 and 20.

The valve seat assembly 24 is supported on the upper bore 20 side of the shoulder 22. The cage 26 engages the valve seat assembly 24 and provides support for the valve member 28 in its movement to and from the valve seat 30. The valve member 28 includes a skirt which depends in surrounding relation to the valve seat assembly 24 when valve member 28 is in engagement with valve seat 30. A restricted flow passage is defined between the skirt and the exterior of valve seat assembly 24. The bonnet 32 is threadedly engaged into the body 10 at the outer extremity of the upper bore 20 and is in engagement with the shoulder 34 on the cage 26 whereby the cage 26 and the valve seat assembly 24 are held in proper position on the annular shoulder 22.

The spring 36, which is a resilient means urging the valve member 28 towards closed position, is in engagement with the upper end of valve member 28 through the spring follower 38 and with the adjusting means, the threaded screw 40 through the spring follower 42

The cage 26 is provided with suitable port 44 whereby the pressure within the cage 26 above the valve member 28 is transmitted into the bonnet 32 above the cage 26. Suitable sealing means 46 is provided to seal between the inner wall of the bore 20 and the exterior of the inner end of the bonnet 32.

The blowdown control assembly 48 is positioned within the lower bore 18. The plug member 50 is threadedly engaged in the bore 18. Annular recess 52 surrounds plug member 50 and is in communication with the passages 54 and inlet 12. The passages 54 are in communication with the bore 56 in plug member 50. The seat insert 58 providing the annular seat 60 is engaged into the enlarged portion of the bore 56 in the inner end of plug member 50. The area of seat 60 is made larger than the area of the seat 30. The valve member 62 is positioned within the enlarged portion of the bore 56 and engages the plunger 64. The valve member 62 includes a seat engaging means and a pressure responsive means. The pressure responsive means coacts with the passage from the inlet A to the line B to define a flow restriction. The valve member 62 is slightly smaller than the enlarged portion of the bore 56 to allow movement to and from engagement with the seat 60 and to provide a restricted flow passage therebetween for flow of fluid through the enlarged portion of bore 56 to the seat 60. The plunger 64 acts as spacer means between valve members by extending from the valve member 62 through the opening in the seat insert 58 and through the opening in the valve seat assembly 24 into engagement with the lower side of the upper valve member 28. The plunger 64 is square in cross section, as shown, to provide a restricted flow area through the openings in the seat insert 58 and the valve seat assembly 24. The corners of the plunger 64 will engage the walls of the openings and serve to guide the plunger as it moves responsive to movement of the valve members. Resilient means, such as the spring 66, is positioned in the bore 56 to urge the valve member 62 upwardly into position on the seat 60. Spring 66 is relatively light in comparison to the spring 36. The lock nut 68 is provided surrounding the plug member 50 to lock it in position once the blowdown control assembly 48 has been adjusted.

The effective areas of valve members 28 and 62 are each larger than the area of valve seat 60. The cross sectional area of plunger 64 is significantly smaller than the area of either seat 30 or seat 60 so that it is ineffective as a force developing member.

Thus, the inlet 12 communicates through the valve seat 60 controlled by the valve member 62 by way of the annular recess 52, the passages 54, the bore 56 and the opening through the seat insert 58 with the control presure port 14. Also, the control presure port 14 is in communication with the exhaust 16 when the valve member 28 is open through the central opening in the valve seat assembly 24, and the ports 70 in the cage 26 to the exhaust 16.

In operation, the adjusting screw 40 is rotated in its threaded connection through bonnet 32 to provide the desired force against the valve member 28 through compression of the spring 36 whereby the valve member 28 will open at a predetermined set pressure. The force exerted upwardly by the spring 66 must be taken into account in this setting of the adjusting screw 40. Normally, once the adjustment screw 40 has been set, it will be locked in position by lock nut 72 and the cap 74 will be threaded onto the upper end of the bonent 32, as shown, and secured in position by a lock wire (not shown). The plug member 50 by rotation will thread inwardly or outwardly in the bore 18 and threby adjust the position of the valve seat 60 with respect to the valve member 62 when the valve member 28 is closed.

With the valve member 28 closed, the pressure fluid from the inlet 12 is conducted through the passage previously described to the control pressure port 14, suitable seals being provided to prevent bypassing of the pressure fluid around the valve seat 60. Thus, when the pressure in the tank T is below the predetermined set relieving pressure, the valve member 28 will close the seat 30 and the valve member 62 will be spaced from the seat 60 allowing direct communication from the inlet 12 to the port 14. This communication will provide pressure fluid to the actuating means of the pressure relief valve R to hold the relief valve shut. When the pressure in the tank T reaches the desired relieving pressure, this pressure is transmitted through line A to the three-way pilot valve P and is exerted on the underside of the valve member 28 tending to lift the valve member 28 from its seat. At such predetermined relieving pressure, the valve member 28 will lift off the seat 30 and, because of the huddling chamber formed in the lower portion of the valve member 28, will continue its upward movement until it is fully open allowing the valve member 62 to close onto its seat 60. The huddling chamber is provided by the skirt on valve member 28 causing a flow restriction when valve member 28 first opens to increase the area against which the pressure is exerted. This assures that valve member 28 moves quickly to its fully opened position. In addition, the restriction to flow around valve member 62, causes a slight pressure drop across valve member 62 when valve member 62 when valve member 28 first opens to increase the force lifting valve member 28. With the valve member 28 fully open, the pressure fluid in the actuating chamber of pressure relief valve R will be vented through the line B, the pilot valve P and its vent line V. With the pressure reduced in the actuating chamber, the relief valve R will open allowing pressure fluids within the tank T to be suitably vented.

The venting of the pressure fluids from the tank T through the valve R will reduce the pressure in the tank T. When the pressure reaches a predetermined closing pressure, the valve member 28, because of the force exerted by the spring 36, will overcome the pressure on valve member 62 which is in opposition to the force of the spring 36. The closing pressure of valve member 28 is less than the opening pressure because the area of valve seat 60 is larger than the area of seat 30. When valve member 28 moves down towards closed position on the valve seat 30, the plunger 64 will move the valve member 62 away from the valve seat 60 thereby providing communication between the inlet 12 and the control pressure port 14. When valve member 62 first cracks open a small flow of fluid passes through the flow area around plunger 64. This causes a pressure increase on the top of valve member 62 resulting in a net decrease in force due to pressure acting up on valve member 62 to assist in the snap closing of valve member 28 on valve seat 30. This will allow the pressure fluids from the tank T to be conducted through the line A and through the pilot valve P and the line B to the actuating chamber of the pressure relief valve R causing the relief valve to close.

Control of the amount of blowdown is desirable since the venting or relieving of fluids under pressure from a system is very often costly. In those systems where a small amount of venting each time the predetermined venting pressure is reached is sufficient, it is extremely desirable to be able to adjust the amount of blowdown or the pressures at which the relief valve opens and closes. To set the closing pressure of the main valve R, the lock nut 68 is first released and then the plug member 50 is threaded either inwardly or outwardly to the lower bore 18 depending upon the desired result. The effect of moving the plug member 50 will vary the distance between the valve seat 60 and the valve seat 30. Since valve member 28 and valve member 62 are interrelated by the plunger 64, a movement of valve seat 60, by movement of the plug member 50, will vary the lift of valve member 28 in opening which, as hereinafter explained, will vary the reseating pressure of the valve member 28.

When the valve seats 30 and 60 are far apart, the lift of the valve member 28 above seat 30 as valve member 62 seats will be relatively small and the increase in the force of the spring 36 resulting from the relatively small compression thereof will be relatively small. For closing valve member 28, the spring force must overcome the system or inlet pressure exerted on the valve member 62 in holding the valve member 62 on the seat 60. Thus, when the system pressure drops sufficiently far, the spring force will overcome the pressure, opening the valve member 62 and closing the valve member 28. Thus, an increased lift of the valve member 28 will increase the force urging the valve member 28 to its normal, closed position and thereby reduce the amount of blowdown; i.e., allow the valve member 28 to close at a higher system pressure. Thus, by varying the distance between the seats 30 and 60, the system pressure at the time of closure of the valve member 28 can be varied to provide a blowdown control adjustment.

The restriction created by the plunger 64 assists in achieving snap action opening of valve member 62 and closing of valve member 28. As valve member 62 cracks open a small flow is initiated therethrough and through this restriction. This creates an immediate pressure increase on the downstream side of valve member 62 resulting in a decrease in the net force urging valve member 62 toward closed position so that valve member 62 snaps to full open position and valve member 28 snaps to full closed position.

The restriction between valve member 62 and the enlarged portion of bore 56 is particularly important to the operation of the valve when it is set to handle gas and receives liquid. Such conditions can occur in propane or butane systems and it is important that the valve relieves at the predetermined relieving pressure even though it is exposed to liquid rather than gas. With liquid flow, as valve member 28 cracks open, flow around valve member 62 creates a small pressure drop to produce an added force lifting valve member 28 to snap it to full open position.

By providing proper relationship of the seat areas, the effective areas of the valve members and the restriction consistent performance characteristics are achieved both on gas relief and liquid relief.

From the foregoing, it can be seen that the present invention provides an improved three-way pilot valve for use with a pressure relief valve and having adjustable means controlling the opening and closing of the relief valve and therefore the amount of blowdown of the system each time the relief valve opens. Adjustment of the reseating of the upper valve member is accomplished by varying the distance between valve seats, while the length of the plunger between the valve members remains fixed so that such adjustment in effect varies the lift of the upper valve member to increase the spring force tending to close this member as it overcomes the system pressure. Such adjustment of blowdown is accomplished without having any substantial effect on the setting of the opening or relieving pressure.

What is claimed is:
1. A pilot valve comprising, a valve body,
a control port into said body,
an inlet into said body,
an outlet from said body,
a first flow passage through said body providing communication between said control port and said outlet,
a second flow passage through said body providing commuciation between said control port and said inlet,
a first valve seat in said first flow passage,
a first valve member movable in said body to engage said first valve seat,
a second valve seat in said second flow passage,
a second valve member having seat engaging means and pressure responsive means and movable in said body to engage said second valve seat,
means defining a flow restriction in said first flow passageway downstream of said first valve seat,
said first valve member having an enlarged diameter in said first flow passage whereby on initial opening of said first valve member, the effective pressure area of said valve member is substantially increased,
spacer means spacing said first and second valve members apart whereby seating of one of said valve members unseats the other of said valve members,
means resiliently urging said first valve member into seated position on said first valve seat, and
said pressure responsive means of said second valve member coacting with said second flow passage to define a flow restriction of substantially constant area indepedent of the relative position of said second valve member with respect to said second valve seat to create a pressure drop across said second valve member whereby the force created by the pressure differential across said pressure responsive means of said second valve member when said first valve member cracks open combines with the pressure force acting on said first valve member to urge said first valve member to full open position with a snap action movement.

2. A pilot valve according to claim 1, including:
a flow restriction between said first and second valve seats to create a pressure drop therethrough when said second valve member cracks open (to provide an increase of back pressure on the downstream side of said second valve member), said restriction providing sufficient restriction to flow so that the pressure force urging said second valve member closed diminishes more rapidly than the build-up of pressure force urging said first valve member open to assure a snap action movement of said first valve member to full closed position.

3. A pilot valve according to claim 1, including:
means accessible to the exterior of said valve body for adjusting the position of said second valve seat to thereby vary the length of travel of said valve members to move from the seated position of said first valve member to the seated position of said second valve member whereby a change in such length of travel will change the pressure from said inlet at which said first valve member moves to seated position with a snap action movement.

4. A pilot valve comprising,
a valve body,
a control port into said body,
an inlet into said body,
an outlet from said body,
a first flow passage through said body providing communication between said control port and said outlet,
a second flow passage through said body providing communication between said control port and said inlet,
a first valve seat in said first flow passage,
a first valve member movable in said body to engage said first valve seat,
a second valve seat in said second flow passage,
a second valve member having seat engaging means and pressure responsive means and movable in said body to engage said second valve seat,
said first valve member defining a skirt surrounding said first valve seat and defining a flow restriction therebetween whereby on initial opening of said first valve member, the effective pressure area of said valve member is substantially increased,
spacer means spacing said first and second valve members apart whereby seating of one of said valve members unseats the other of said valve member,
means resiliently urging said first valve member into seated position on said first valve seat, and
said pressure responsive means of said second valve member coacting with said second flow passage to define a flow restriction of substantially constant area independent of the relative position of said second valve member with respect to said second valve seat to create a pressure drop across said second valve member whereby the force created by the pressure differential across said pressure responsive means of said second valve member when said first valve member cracks open combines with the pressure force acting on said first valve member to urge said first valve member to full open position with a snap action movement, a flow restriction between said first and second valve seats to create a pressure drop therethrough when said valve member cracks open (to provide an increase of back pressure on the downstream side of said second valve member), said restriction providing sufficient restrication to flow so that the pressure force urging said second valve member closed diminishes more rapidly than the build-up of pressure force urging said first valve member open to assure a snap action movement of said first valve member to full closed position, and means accessible to the exterior of said valve body for adjusting the position of said second valve seat to thereby vary the length of travel of said valve members to move from the seated position of said first valve member to the seated position of said second valve member whereby a change in such length of travel will change the pressure from said inlet at which said first valve member moves to seated position.

5. A pilot valve according to claim 1, including, a plug member threadedly engaged within said body, said plug member defining said second valve seat whereby rotation of said plug member in one direction moves said second valve closer to said first valve seat and rotation of said plug member in the opposite direction moves said second valve seat farther from said first valve seat whereby a change in the position of said second valve seat changes the inlet pressure at which said first valve member seats.

6. A pressure relief valve comprising, a main valve having an inlet, an outlet and an actuating chamber, a pilot valve, a first communication from said actuating chamber through said pilot valve to exhaust whereby fluid pressure from said actuating chamber may be vented to allow said main valve to open, a second communication from said inlet through said pilot valve to said actuating chamber whereby the fluid pressure from said inlet is transmitted to said actuating chamber to maintain said main valve closed, a first valve in said pilot valve controlling said first communication means, a second valve in said pilot valve controlling said second communication means, and having seat engaging means and pressure responsive means, resilient means urging said first valve toward closed position, means spacing said first and second valves apart whereby said first valve opens when said second valve closes and said second valve opens when said first valve closes, and means adjusting the length of travel of said valves whereby the force of said resilient means is varied to vary the closing of said first valve against the inlet pressure exerted on said second valve when closed and thereby close said relief valve at a predetermined pressure within said inlet, said pressure responsive means of said second valve member coacting with said second flow passage to define a flow restriction of substantially constant area independent of the relative position of said second valve member with respect to said second valve seat to create a pressure drop across said pressure responsive means of said second valve member whereby the force created by the pressure differential across said second valve member when said first valve member cracks open combines with the pressure force acting on said first valve member to urge said first valve member to full open position with a snap action movement, a flow restriction between said first and second valve seats to create a pressure drop therethrough when said second valve member cracks open (to provide an increase of back pressure on the downstream side of said second valve member), said restriction providing sufficient restriction to flow so that the pressure force urging said second valve member closed diminishes more rapidly than the build-up of pressure force urging said first valve member open to assure a snap action movement of said first valve member to full closed position, and means accessible to the exterior of said valve body for adjusting the position of said second valve seat to thereby vary the length of travel of said valve members to move from the seated position of said first valve member to the seated position of said second valve member whereby a change in such length of travel will change the pressure from said inlet at which said first valve member moves to seated position.

7. A pressure relief valve according to claim 6 wherein, said adjusting means adjusts the spacing between the valve seats for said first and second valves.

8. A pressure relief valve according to claim 6 including, means adjusting said resilient means to preselect the inlet pressure at which said first valve opens whereby the pressures at which said main valve opens and closes may be preselected.

9. A pilot valve according to claim 2 wherein, said flow restrictions and the effective pressure areas of said valve members are interrelated so that on cracking of said first valve member, the resultant force of the combined forces on said valve members remain substantially the same with liquid or gas flowing therethrough.

References Cited

UNITED STATES PATENTS

| | | | |
|---|---|---|---|
| 2,477,247 | 7/1949 | Haberland | 137—488 |
| 2,571,154 | 10/1951 | Mercier | 137—492.5 XR |
| 2,619,109 | 11/1952 | Garrett et al. | 137—488 |
| 2,649,115 | 8/1953 | Deardorff | 137—488 |
| 3,294,111 | 12/1966 | Abercrombie et al. | 137—102 XR |
| 3,304,951 | 2/1967 | Farris | 137—492 |

M. CARY NELSON, Primary Examiner

R. J. MILLER, Assistant Examiner

U.S. Cl. X.R.

137—492